United States Patent
Li et al.

(10) Patent No.: US 9,769,091 B2
(45) Date of Patent: Sep. 19, 2017

(54) METHOD AND SYSTEM FOR REDUCING PACKET LOSS IN A SERVICE PROTECTION SCHEME

(71) Applicant: HUAWEI TECHNOLOGIES CO., LTD., Shenzhen, Guangdong (CN)

(72) Inventors: Yanwei Li, Beijing (CN); Chi Zhang, Beijing (CN); Han Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 14/582,601

(22) Filed: Dec. 24, 2014

(65) Prior Publication Data
US 2015/0156142 A1    Jun. 4, 2015

Related U.S. Application Data

(63) Continuation of application No. PCT/CN2013/077640, filed on Jun. 21, 2013.

(30) Foreign Application Priority Data

Jun. 28, 2012  (CN) .......................... 2012 1 0217089

(51) Int. Cl.
*H04L 12/939* (2013.01)
*H04L 12/721* (2013.01)
(Continued)

(52) U.S. Cl.
CPC ............ *H04L 49/552* (2013.01); *H04L 45/22* (2013.01); *H04L 45/68* (2013.01); *H04L 49/206* (2013.01); *H04L 45/12* (2013.01)

(58) Field of Classification Search
CPC . H04L 12/4675; H04L 43/0876; H04L 43/16; H04L 45/00; H04L 45/02;
(Continued)

(56) References Cited

U.S. PATENT DOCUMENTS 6,256,295 B1 * 7/2001 Callon ................ H04L 49/3081
370/254
6,823,462 B1 * 11/2004 Cheng ................ H04L 63/0272
709/227
(Continued)

FOREIGN PATENT DOCUMENTS

CN      101374075      2/2009
CN      102035681      4/2011
(Continued)

OTHER PUBLICATIONS

International Search Report mailed Sep. 26, 2013, in corresponding International Application No. PCT/CN2013/077640.
(Continued)

*Primary Examiner* — Michael Thier
*Assistant Examiner* — Eric Nowlin
(74) *Attorney, Agent, or Firm* — Staas & Halsey LLP

(57) ABSTRACT

A method for reducing packet loss includes: performing automatic and real-time adjustment to cost values of a first route and a second route, so that the cost value of the corresponding route of the primary pseudo wire (PW) is lower than that of the corresponding route of the secondary PW. A corresponding system is also provided. Automatic and real-time adjustment to cost values of the first route and the second route, enable the cost value of the corresponding route of the primary PW to be lower than that of the corresponding route of the secondary PW, and therefore enable the downlink traffic not passing through the PW that just recovers from a failure, thereby reducing packet loss when the downlink traffic passes through the PW while the primary PW just recovers from a failure.

6 Claims, 4 Drawing Sheets

(51) Int. Cl.
*H04L 12/707* (2013.01)
*H04L 12/931* (2013.01)

(58) Field of Classification Search
CPC ....... H04L 45/04; H04L 45/12; H04L 45/121; H04L 45/123; H04L 45/124; H04L 45/22; H04L 45/24; H04L 45/28; H04L 45/68; H04L 47/125; H04L 49/206; H04L 49/552; H04L 41/0654; H04L 45/306; H04L 45/70; H04W 40/02; H04W 40/22; H04W 40/248; H04B 10/032
See application file for complete search history.

(56) References Cited

U.S. PATENT DOCUMENTS

| | | | | |
|---|---|---|---|---|
| 7,860,112 | B2* | 12/2010 | Kompella | H04L 12/2859 370/389 |
| 8,103,789 | B1* | 1/2012 | Gan | G06F 11/1464 370/242 |
| 8,139,605 | B2* | 3/2012 | Bernard | H04J 3/0632 370/401 |
| 8,320,389 | B2* | 11/2012 | Zhang | H04L 45/00 370/401 |
| 8,351,325 | B2* | 1/2013 | Hinz | H04L 45/68 370/218 |
| 8,369,345 | B1* | 2/2013 | Raghunathan | H04L 45/60 370/397 |
| 8,369,357 | B2* | 2/2013 | Iyer | H04L 29/12028 370/310 |
| 8,422,514 | B1* | 4/2013 | Kothari | H04L 12/4633 370/351 |
| 8,537,681 | B1* | 9/2013 | Krishnan | H04L 12/4625 370/235 |
| 8,879,383 | B1* | 11/2014 | Cirkovic | H04L 45/00 370/219 |
| 9,525,625 | B2* | 12/2016 | Zheng | H04Q 11/00 |
| 2005/0265309 | A1* | 12/2005 | Parandekar | H04L 12/2801 370/351 |
| 2006/0088033 | A1* | 4/2006 | Farid | H04L 12/24 370/395.5 |
| 2007/0086448 | A1* | 4/2007 | Hu | H04L 12/4641 370/389 |
| 2008/0205265 | A1* | 8/2008 | Del Regno | H04L 45/00 370/221 |
| 2009/0274155 | A1* | 11/2009 | Nakash | H04L 12/462 370/395.53 |
| 2009/0290591 | A1* | 11/2009 | Zhang | H04L 45/00 370/401 |
| 2009/0316695 | A1* | 12/2009 | Li | H04L 12/2859 370/389 |
| 2011/0292933 | A1* | 12/2011 | Rodriguez Perez | H04L 45/586 370/389 |
| 2012/0044943 | A1* | 2/2012 | Hinz | H04L 45/68 370/401 |
| 2012/0224584 | A1* | 9/2012 | Zhang | H04L 45/00 370/395.53 |
| 2013/0272114 | A1* | 10/2013 | Ye | H04L 45/28 370/219 |
| 2014/0321472 | A1* | 10/2014 | Jiang | H04L 12/4641 370/408 |
| 2015/0156142 | A1* | 6/2015 | Li | H04L 45/68 370/389 |
| 2015/0188812 | A1* | 7/2015 | Zheng | H04Q 11/00 398/45 |
| 2015/0295725 | A1* | 10/2015 | Yuan | H04L 45/16 370/390 |

FOREIGN PATENT DOCUMENTS

| | | |
|---|---|---|
| CN | 102164085 | 8/2011 |
| CN | 102769561 | 11/2012 |
| EP | 2720419 A1 | 4/2014 |

OTHER PUBLICATIONS

Extended European Search Report dated Mar. 18, 2014 in corresponding European Patent Application No. 13173728.0.
PCT International Search Report dated Sep. 26, 2013 in corresponding International Patent Application No. PCT/CN2013/077640.
Muley et al., "Pseudowire Preferential Forwarding Status Bit", Network Working Group, Internet Draft, May 1, 2012, pp. 1-36.

* cited by examiner

METHOD AND SYSTEM FOR REDUCING PACKET LOSS IN A SERVICE PROTECTION SCHEME

CROSS-REFERENCE TO RELATED APPLICATIONS

This application is a continuation of International Application No. PCT/CN2013/077640, filed on Jun. 21, 2013, which claims priority to Chinese Patent Application No. 201210217089.8, filed on Jun. 28, 2012, both of which are hereby incorporated by reference in their entireties.

TECHNICAL FIELD

Embodiments of the present invention relate to the field of communications technologies, specifically to a method and a system for reducing packet loss in a service protection scheme.

BACKGROUND

A user access device communicates with a convergence router by using a pseudo wire (Pseudo Wire, PW), the convergence router terminates the PW, and then forwards data to a target network device by using a routing protocol or relying on a Layer 3 virtual private network of the routing protocol (hereinafter abbreviated as L3VPN, Layer 3 Virtual Private network). Specifically, the convergence router communicates with the user access device by using a PW through a Layer 2 virtual Ethernet (L2VE) interface, and communicates with the target network device by using the routing protocol and relying on the L3VPN of the routing protocol through the Layer 3 virtual Ethernet (L3VE) interface, and the virtual Ethernet interface group (VE Group) is configured on the convergence router to bind the L2VE interface to the L3VE interface, so as to achieve the function of terminating traffic on Layer 2 and forwarding on Layer 3.

In order to protect users' services, the user access device connects to their respective L2VE interfaces of the primary and secondary convergence routers by using the primary and secondary PW, and the primary and secondary convergence routers then connect to the target network device through their respective L3VE interfaces. The traffic may be quickly switched to the secondary PW after the primary PW fails; and after failure recovery of the primary PW, the traffic may be switched back to the primary PW after a period of preset time.

To facilitate understanding, referring to FIG. 1, networking under the scenario of the Internet protocol backhaul network (Internet Protocol Backhaul Network, IP Backhaul) is illustrated. A base transceiver station (Base Transceiver Station, BTS) (101) is equivalent to a user-side network device; a cell side gateway (Cell Site Gateway, CSG) (102) is equivalent to a user access device, which may be an access router supporting PW function, and be configured to access to the user-side network device; a radio service gateway (Radio Service Gateway, RSG) 1 (103) and an RSG2 (104) are equivalent to a convergence router; and a radio network controller (Radio Network Controller, RNC) (105) is equivalent to a target network device.

The RSG1 (103) communicates with the CSG (102) by using a PW (106), where the PW (106) is the primary PW under normal circumstances; the RSG1 (103) communicates with the RNC (105) through an L3VPN (112). The RSG1 (103) is configured with an L2VE interface (108) and an L3VE interface (109), and a VE Group is established on the RSG1 to bind the L2VE interface (108) to the L3VE interface (109). The L2VE interface (108) is connected to the primary PW (106), and the L3VE interface (109) is connected to the L3VPN (112).

The RSG2 (104) communicates with the CSG (102) by using a PW (107), where the PW (107) is a secondary PW under normal circumstances; the RSG2 (104) is configured with an L2VE interface (110) and an L3VE interface (111), and a VE Group is established on the RSG2 to bind the L2VE interface (110) to the L3VE interface (111). The L2VE interface (110) is connected to a secondary PW (107), and the L3VE interface (111) is connected to an L3VPN (113).

The uplink traffic refers to the traffic from the BTS (101) to the RNC (105), and the downlink traffic refers to the traffic from the RNC (105) to the BTS (101).

In prior art, in the uplink traffic direction, the CSG (102) regularly sends an address resolution protocol (Address Resolution Protocol, ARP) of the user-side network device BTS (101) to the RSG1 (103) and the RSG2 (104) simultaneously; the L3VE interface (109) and the L3VE interface (111) are simultaneously set at the up state, the RSG1 (103) and the RSG2 (104) respectively release routes to the RNC (105), so that the RNC (105) has two routes to choose from in the downlink direction, and the RNC (105) may select one according to the route selection rules, such as BGP attribute.

Under normal circumstances, the uplink traffic is forwarded by using the primary PW, and the uplink traffic passes through the following nodes: the BTS (101)->the CSG (102)->the RSG1 (103)->the RNC (105). If it is assumed that the RNC (105) selects the route to the RSG1 in the downlink traffic direction, that is, the downlink traffic passes through the following nodes: the RNC (105)->the RSG1 (103)->the CSG (102)->the BTS (101).

If the PW (106) fails and changes to be in the down state, the PW (106) changes to be in the secondary state, and therefore the L3VE (109) is triggered to be in the down state and the route to the RSG1 (103) on the RNC (105) is deleted, and simultaneously ARP of the BTS (101) on the RSG1 (109) is triggered to be deleted. The RNC (105) immediately switches the traffic in the downlink direction to the RSG2 (104), so that nodes through which the downlink traffic passes are the RNC (105)->the RSG2 (104)->the CSG (102)->the BTS (101). In this case, the primary and secondary PWs are switched, the PW (107) changes to be the primary PW, and the path through which the uplink traffic that selects the PW (107) passes is the same as the path through which the downlink traffic passes, that is, nodes through which the uplink traffic passes are the BTS (101)->the CSG (102)->the RSG2 (104)->the RNC (105).

The PW (106) changes to be in the up state due to failure recovery of the PW (106) after a period of time. In this case, the PW (106) is still in the secondary state and, after a period of preset time, changes to be in the primary state after a second primary and secondary switch, then the PW (107) changes to be in the secondary state and the L3VE (109) is triggered to be in the up state, and the RNC (105) switches the downlink traffic path to the RSG1 (103). However, after the PW (106) re-changing to be in the up state, the RNC (105) may only re-learn ARP of the user-side network device after a period of time, and the downlink traffic encounters packet loss in this period of time.

SUMMARY

Embodiments of the present invention provide a method and a system for reducing packet loss in a service protection scheme, which may solve the problem of packet loss of downlink traffic in prior art when the failed primary PW recovers.

In one aspect, an embodiment of the present invention provides a method for reducing packet loss in a service protection scheme, including:

communicating, by a first network device, with a user access device by using a first pseudo wire PW through a first Layer 2 virtual Ethernet L2VE interface, where the first network device communicates with a target network device by using a first route through a first Layer 3 virtual Ethernet L3VE interface, and the first L2VE interface and the first L3VE interface belong to the first virtual Ethernet interface group VE Group;

communicating, by a second network device, with the user access device by using the second PW through a second L2VE interface, where the second network device communicates with the target network device by using a second route through a second L3VE interface, and the second L2VE interface and the second L3VE interface belong to the second VE Group;

when the first PW is primary, the second PW changes to be secondary, setting, by the first network device, a cost value of the first route to a preset first value, and setting, by the second network device, a cost value of the second route to a preset second value, where the first value and the second value are both non-negative values, and the first value is smaller than the second value; and when the first PW is secondary, the second PW changes to be primary, setting, by the first network device, the cost value of the first route to the second value, and setting, by the second network device, the cost value of the second route to the first value.

In another aspect, an embodiment of the present invention provides a system for reducing packet loss in a service protection scheme, including:

a first network device and a second network device;

the first network device includes a first Layer 2 virtual Ethernet L2VE interface, a first Layer 3 virtual Ethernet L3VE interface, a first communication unit, and a first processing unit;

the second network device includes a second L2VE interface, a second L3VE interface, a second communication unit, and a second processing unit;

the first communication unit is configured to communicate with the user access device by using a first pseudo wire PW through the first L2VE interface and communicate with the target network device by using a first route through the first L3VE interface, where the first L2VE interface and the first L3VE interface belong to the first virtual Ethernet interface group VE Group;

the second communication unit is configured to communicate with the user access device by using a second PW through the second L2VE interface and communicate with the target network device by using a second route through the first L3VE interface, where the second L2VE interface and the second L3VE interface belong to the second VE Group;

the first processing unit is configured to set the cost value of the first route to the preset first value when the first PW is primary; accordingly, the second processing unit is configured to set the cost value of the second route to the preset second value when the second PW is a corresponding secondary PW of the first PW, where the first value and the second value are both non-negative values, and the first value is smaller than the second value;

the first processing unit is further configured to set the cost value of the first route to the second value when the first PW is secondary; accordingly, the second processing unit is further configured to set the cost value of the second route to the first value when the second PW is a corresponding primary PW of the first PW.

Embodiments of the invention provide a method and a system for reducing packet loss in a service protection scheme, which, by performing automatic and real-time adjustment to cost values of the first route and the second route, enables the cost value of the corresponding route of the primary PW to be lower than that of the corresponding route of the secondary PW, and therefore enable the downlink traffic not passing through the PW that just recovers from a failure, thereby reducing packet loss when the downlink traffic passes through the primary PW that just recovers from a failure.

DESCRIPTION OF EMBODIMENTS

The following describes the technical solution of the present invention in combination with the accompanying drawings and embodiments.

Figure 2:
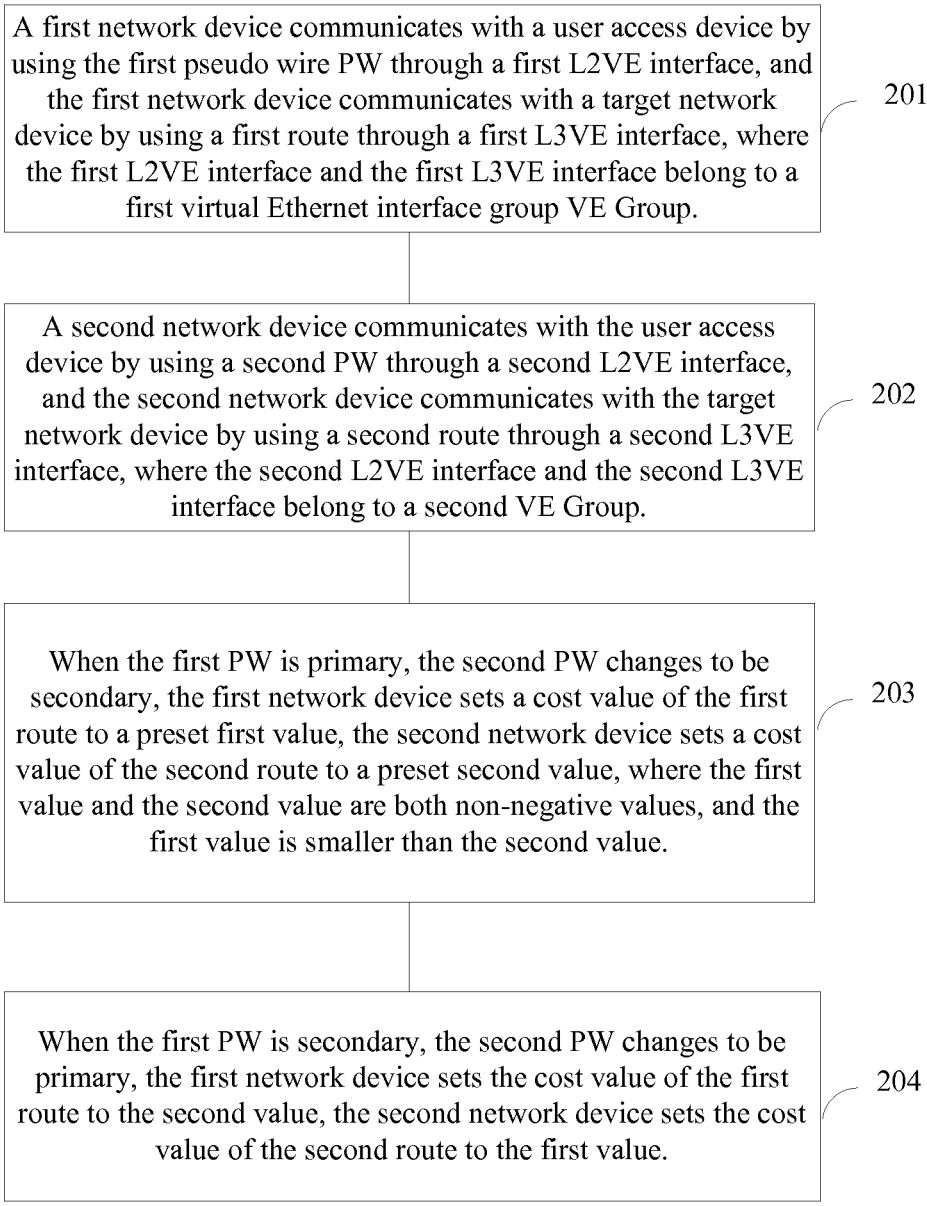
FIG. 2 is a flowchart for a method for reducing packet loss in a service protection scheme provided in the embodiment of the present invention.

As shown in FIG. 2, embodiment of the present invention provides a method for reducing packet loss in a service protection scheme, including:

201. A first network device communicates with a user access device by using a first pseudo wire PW through a first L2VE interface, and the first network device communicates with a target network device by using a first route through a first L3VE interface, where the first L2VE interface and the first L3VE interface belong to a first virtual Ethernet interface group VE Group.

202. A second network device communicates with the user access device by using a second PW through a second L2VE interface, and the second network device communicates with the target network device by using a second route through a second L3VE interface, where the second L2VE interface and the second L3VE interface belong to a second VE Group.

The first network device and the second network device communicate with other devices by using a PW through the L2VE interface, communicate with other devices by using a route through the L3VE interface, and may bind the L2VE interface to the L3VE interface by using VE Group. It may be, for example, a router from its shape.

The user access device may establish PW function with other devices, for example, it may be a router, or may be a device in the packet transport network (Packet Transport Network, PTN).

The target network device may communicate with other devices by using the routing protocol or the L3VPN, for example, it may be a router.

The first route and the second route refer to routes in the IP routing protocol. Certainly, in another example, the first network device may further communicate with the target network device by using L3VPN through the first L3VE interface, and the second network device may further communicate with the target network device by using the L3VPN through the second L3VE interface, because the L3VPN is dependent on the route in the IP routing protocol.

The first PW and the second PW are both served as a secondary PW to each other.

Figure 1:
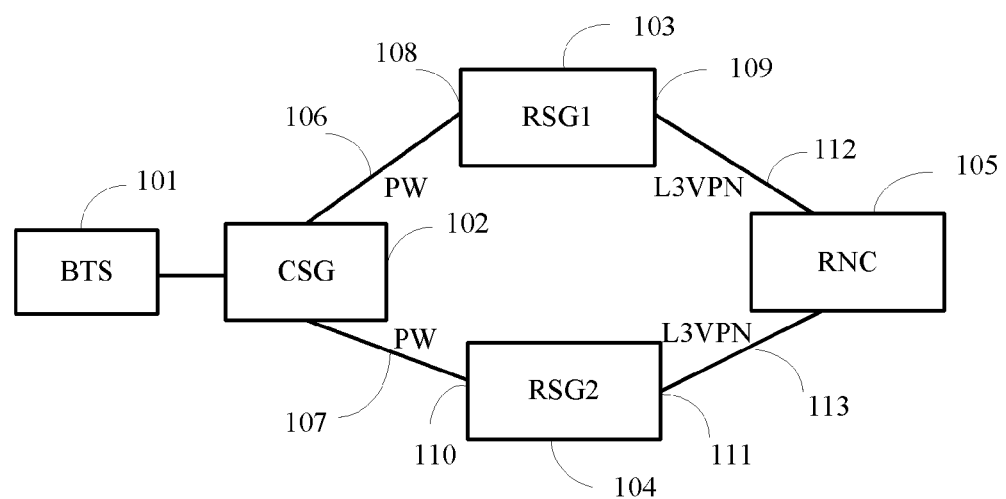
FIG. 1 is a networking schematic diagram under the scenario of the Internet protocol backhaul network.

To facilitate understanding, referring to FIG. 1, networking under the scenario of the IP backhaul is illustrated. The first network device is an RSG1 (103), the second network device is an RSG2 (104), the user access device is a CSG (102), and the target network device is an RNC (105).

The RSG1 (103) communicates with the CSG (102) by using a PW (106), where the PW (106) is a primary PW under normal circumstances, and the RSG1 (103) communicates with the RNC (105) by using an L3VPN (112). The RSG1 (103) is configured with an L2VE interface (108) and an L3VE interface (109), and a VE Group is established on the RSG1 to bind the L2VE interface (108) to the L3VE interface (109). The L2VE interface (108) is connected to the primary PW (106), and the L3VE interface (109) is connected to the L3VPN (112);

The RSG2 (104) communicates with the CSG (102) by using a PW (107), where the PW (107) is a secondary PW under normal circumstances; the RSG2 (104) is configured with an L2VE interface (110) and an L3VE interface (111), and a VE Group is established on the RSG2 to bind the L2VE interface (110) to the L3VE interface (111). The L2VE interface (110) is connected to a secondary PW (107), and the L3VE interface (111) is connected to an L3VPN (113).

The uplink traffic refers to the traffic from the BTS (101) to the RNC (105), and the downlink traffic refers to the traffic from the RNC (105) to the BTS (101).

203. When the first PW is primary, the second PW changes to be secondary, the first network device sets a cost value of the first route to a preset first value, and the second network device sets a cost value of the second route to a preset second value, where the first value and the second value are both non-negative values, and the first value is smaller than the second value.

204. When the first PW is secondary, the second PW changes to be primary, the first network device sets the cost value of the first route to the second value, and the second network device sets the cost value of the second route to the first value.

For example, the command line is input on the RGS1 (103) and the RSG2 (104) each after the RSG1 (103) and the RSG2 (104) are started, the first value is configured to, for example, 5, and the second value is configured to, for example, 100, by using the command line. Here, the first value and the second value are values used for route cost.

For another example, the first value is a cost default value. Persons skilled in the art may understand that the cost default value is 0. In this case, the second value, greater than 0, for example, 100, needs only to be pre-configured on the RSG1 (103) and the RSG (104).

Certainly, the first value and the second value may also be pre-configured on the RSG1 (103) and the RSG2 (104) through a network management system.

Referring to FIG. 1, the following provides the description in several situations, assuming that the first value is 5, and the second value is 100.

(1) Initial normal state: the PW (106) is the primary PW in the up state, while the PW (107) is the secondary PW in the up state.

In this case, the RSG1 (103) sets the cost value of the first route, that is, the route depended by the L3VPN (112), to 5; the RSG2 (104) sets the cost value of the second route, that is, the route depended by the L3VPN (113), to 100. The RNC (105) has two routes in the downlink direction, where the cost value of the route to the RSG1 (103) is 5, the cost value of the route to the RSG2 (104) is 100, and the RNC (105) selects a route whose cost value is 5, the downlink traffic passing through the RSG1 (103).

(2) Failure state of the PW (106): The PW (106) is the secondary PW in the down state, whereas the PW (107) is the primary PW in the up state.

In this case, the RSG1 (103) sets the cost value of the first route to 100; the RSG2 (104) sets the cost value of the second route to 5. Because the PW (106) fails and therefore the L3VE interface (109) is triggered to be in the down state, the route to the RSG1 (103) is correspondingly deleted from the RNC (105), only leaving the route to the RSG2 (104) whose cost value is 5. The downlink traffic passes through the RSG2 (104).

(3) The PW (106) recovers from a failure, but has still not come to the scheduled switch-back time: The PW (106) is the secondary PW in the up state, and the PW (107) is the primary PW in the up state.

In this case, the cost value of the first route is 100, and the cost value of the second route is 5. Because the PW (106) recovers from the failure and the L3VE interface (109) again is triggered to be in the up state, the RNC (105) re-learns the route to the RSG1 (103). The RNC (105) has two routes in the downlink direction, where the cost value of the route to the RSG1 (103) is 100, the cost value of the route to the RSG2 (104) is 5, and the RNC (105) selects a route whose cost value of 5. The downlink traffic passes through the RSG2 (104).

(4) When the switch-back time arrives, the PW (106) changes to be the primary PW in the up state again, and the PW (107) changes to be the secondary PW in the up state.

This state is the same as that in item (1), and is not repeated any further.

From the foregoing, it may be seen that, by enabling automatic and real-time interaction between the PW state and the cost of corresponding route, the downlink traffic may always pass through a path corresponding to the primary PW, therefore, for situations stated in the foregoing item (3), packet loss as in prior art no longer occurs.

Embodiments of the present invention provide a method for reducing packet loss in a service protection scheme, which, by performing automatic and real-time adjustment to cost values of the first route and the second route, enables the cost value of corresponding route of the primary PW to be lower than that of corresponding route of the secondary PW, and therefore enable the downlink traffic not to pass through the PW that just recovers from a failure, thereby reducing packet loss when the downlink traffic passes through the PW while the primary PW just recovers from a failure.

Figure 3:
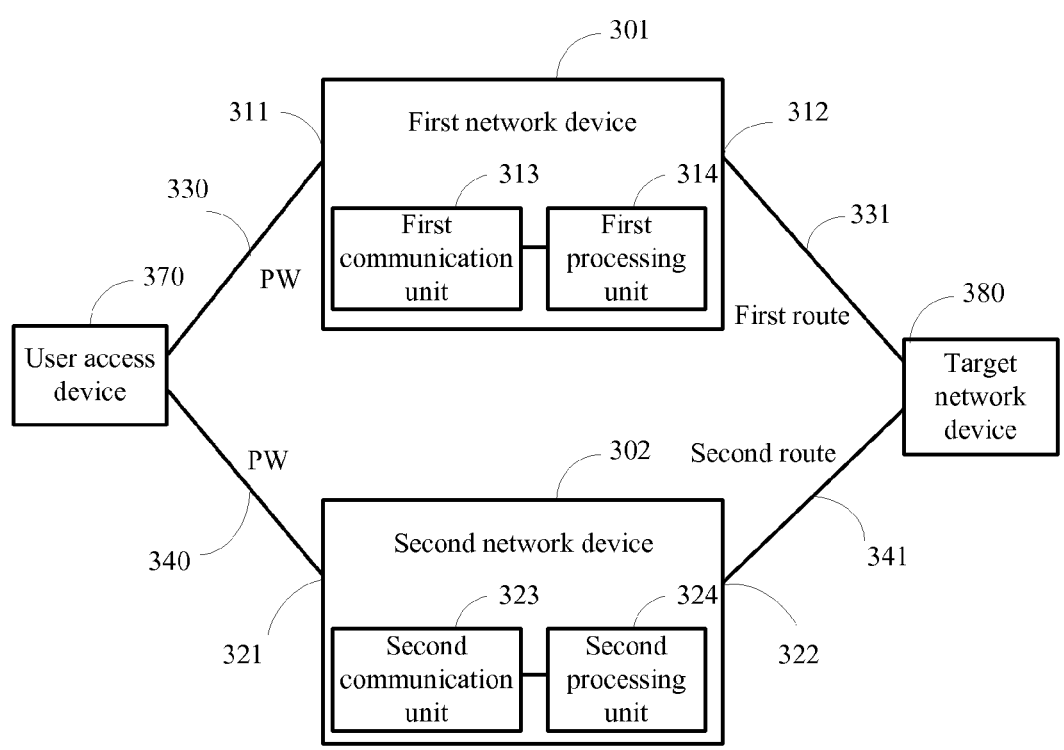
FIG. 3 is a schematic diagram for a system for reducing packet loss in a service protection scheme provided in the embodiment of the present invention.

Referring to FIG. 3, an embodiment of the present invention provides a system for reducing packet loss in a service protection scheme, including:

a first network device (301) and a second network device (302).

The first network device (301) includes a first L2VE interface (311), a first L3VE interface (312), a first communication unit (313), and a first processing unit (314).

The second network device (302) includes a second L2VE interface (321), a second L3VE interface (322), a second communication unit (323), and a second processing unit (324).

The first communication unit (313) is configured to communicate with a user access device (370) by using a first PW (330) through the first L2VE interface (311) and communicate with a target network device (380) by using a first route (331) through the first L3VE interface (312), where the first L2VE (311) interface and the first L3VE interface (312) belong to a first virtual Ethernet interface group VE Group.

The second communication unit (323) is configured to communicate with the user access device (370) by using a second PW (340) through the second L2VE interface (321) and communicate with the target network device (380) by using a second route (341) through the second L3VE interface (322), where the second L2VE interface (321) and the second L3VE interface (322) belong to a second VE Group.

The first processing unit (314) is configured to set a cost value of the first route (331) to a preset first value when the first PW (330) is primary; accordingly, the second processing unit (324) is configured to set a cost value of the second route (341) to a preset second value when the second PW (340) is a corresponding secondary PW of the first PW (330), where the first value and the second value are both non-negative values, and the first value is smaller than the second value.

The first processing unit (314) is further configured to set the cost value of the first route (331) to the second value when the first PW (330) is secondary; accordingly, the second processing unit (324) is further configured to set the cost value of the second route (341) to the first value when the second PW (340) is a corresponding primary PW of the first PW (330).

Figure 4:
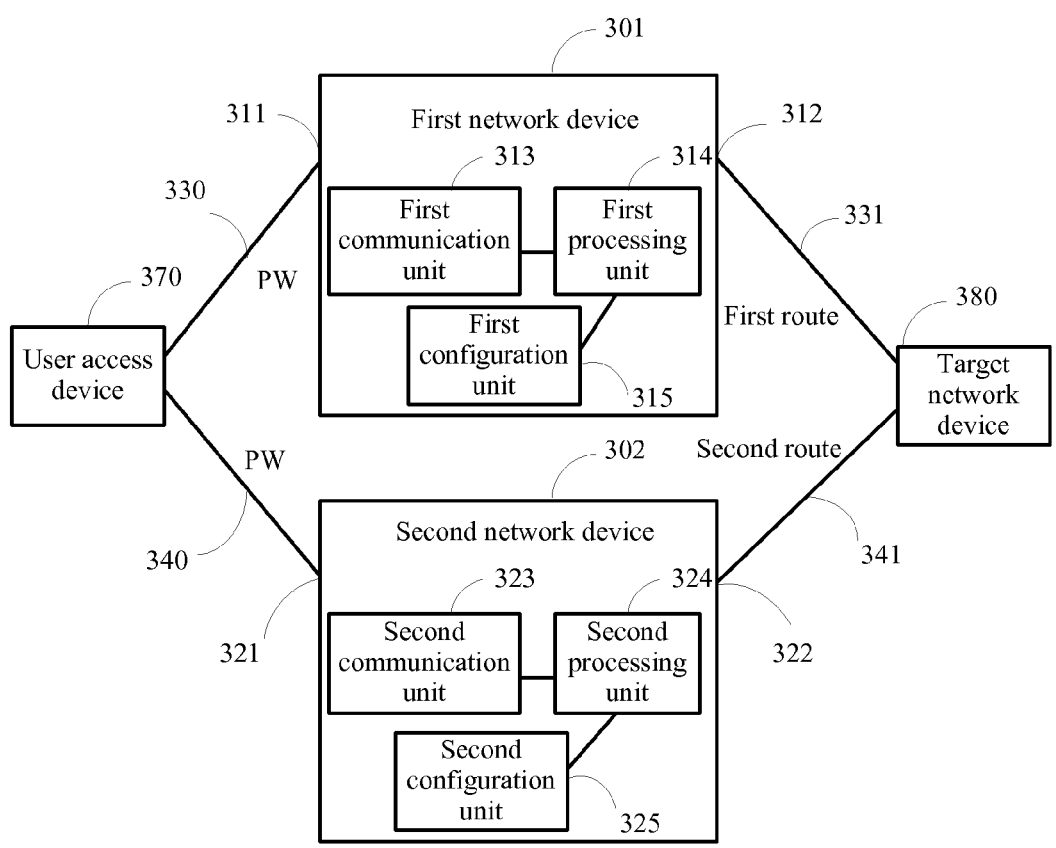
FIG. 4 is another schematic diagram for a system for reducing packet loss in a service protection scheme provided in the embodiment of the present invention.

For example, as shown in FIG. 4, the first network device (301) further includes:
 a first configuration unit (315), configured to receive a command line, where the first value and the second value are pre-configured on the first network device by using the command line;
the second network device (302) further includes:
 a second configuration unit (325), configured to receive the command line, where the first value and the second value are pre-configured on the second network device by using the command line.

For example, the first value is a cost default value. The first network device (301) further includes:
 a first configuration unit, configured to receive a command line, where the second value is pre-configured on the first network device by using the command line.
The second network device (302) further includes:
 a second configuration unit, configured to receive the command line, where the second value is pre-configured on the second network device by using the command line.

Embodiments of the present invention provide a system for reducing packet loss in a service protection scheme, which, by performing automatic and real-time adjustment to cost values of the first route and the second route, enables the cost value of corresponding route of the primary PW to be lower than that of corresponding route of the secondary PW, and therefore enable the downlink traffic not passing through the PW that just recovers from a failure, thereby reducing packet loss when the downlink traffic passes through the PW while the primary PW just recovers from a failure.

For example, units in embodiments shown in FIG. 3 and FIG. 4 may be combined into one or more units.

For another example, the unit or sub-unit may be realized by hardware. Persons of ordinary skill in the art may understand that all or part of the steps in a variety of methods of the foregoing embodiments may be implemented by a program instructing relevant hardware, the program may be stored in a computer readable storage medium, for example, the storage medium may include: a read only memory, a random access memory, a magnetic disk or an optical disk.

The foregoing describes in detail for the method and the system for reducing packet loss in a service protection scheme provided by embodiments of the present invention, but the foregoing embodiments are merely intended for describing the method and core ideas of the present invention other than limiting the present invention. Changes or replacements that readily occur to persons skilled in the art within the technical scope disclosed by the present invention should fall within the scope of protection of the present invention.

The invention claimed is:

1. A method for reducing packet loss in a service protection scheme, comprising:
 communicating, by a first network device, with a user access device by using a first pseudo wire (PW) through a first Layer 2 virtual Ethernet (L2VE) interface, wherein the first network device communicates with a target network device by using a first route through a first Layer 3 virtual Ethernet (L3VE) interface, and the first L2VE interface and the first L3VE interface belong to a first virtual Ethernet interface group (VE Group);
 communicating, by a second network device, with the user access device by using a second PW through a second L2VE interface, wherein the second network device communicates with the target network device by using a second route through a second L3VE interface, and the second L2VE interface and the second L3VE interface belong to a second VE Group;
 in an initial state of normal operation of the first PW and the second PW:
  setting the first PW to be primary;
  setting the second PW to be secondary;
  setting, by the first network device, a first cost value of the first route to a first value which is preset; and
  setting, by the second network device, a second cost value of the second route to a second value which is preset;
 upon determining the first PW is in a failure state:
  changing the first PW to be secondary;
  changing the second PW to be primary;
  setting, by the first network device, the first cost value to the second value; and
  setting, by the second network device, the second cost value to the first value; and
 upon determining that the first PW recovers from the failure state:
  waiting until a scheduled switch-back time while the first PW is secondary, the second PW is primary, the first cost value is the second value, and the second cost value is the first value;
  changing the first PW to be primary;
  changing the second PW to be secondary;
 setting, by the first network device, the first cost value to the first value; and setting, by the second network device, the second cost value to the second value,
wherein:
the first value and the second value are both non-negative values,
the first value is smaller than the second value, and
a traffic in a downlink direction from the target network device to the user access device passes through the first route when the first cost value is lower than the second cost value, and passes through the second route when the second cost value is lower than the first cost value.

2. The method of claim 1, further comprising:
receiving, by the first network device, a command line, wherein the first value and the second value are pre-configured on the first network device by using the command line; and
receiving, by the second network device, the command line, wherein the first value and the second value are pre-configured on the second network device by using the command line.

3. A system for reducing packet loss in a service protection scheme, comprising:
a first network device; and
a second network device; wherein:
the first network device comprises a first Layer 2 virtual Ethernet (L2VE) interface, a first Layer 3 virtual Ethernet (L3VE) interface, a first transceiver, and a first processor;
the second network device comprises a second L2VE interface, a second L3VE interface, a second transceiver, and a second processor; wherein:
the first transceiver is configured to communicate with a user access device by using a first pseudo wire (PW) through the first L2VE interface and communicate with a target network device by using a first route through the first L3VE interface, the first L2VE interface and the first L3VE interface belonging to a first virtual Ethernet interface group (VE Group),
the second transceiver is configured to communicate with the user access device by using a second PW through the second L2VE interface and communicate with the target network device by using a second route through the second L3VE interface, the second L2VE interface and the second L3VE interface belonging to a second VE Group,
in an initial state of normal operation of the first PW and the second PW:
the first processor is configured to set a first cost value to a first value, the first value being preset,
the first PW is set to primary,
the second processor is configured to set a second cost value to a second value, the second value being preset,
the second PW is set to a corresponding secondary PW of the first PW,
upon determining the first PW is in a failure state:
the first processor is further configured to set the first cost value to the second value,
the first PW is set to secondary, and
the second processor is further configured to set the second cost value to the first value,
the second PW is set to a corresponding primary PW of the first PW,
upon determining the first PW is in a failure state:
the first processor is further configured to set the first cost value to the second value,
the first PW is set to secondary, and
the second processor is further configured to set the second cost value to the first value,
the second PW is set to a corresponding primary PW of the first PW,
upon determining that the first PW recovers from the failure state:
waiting until a scheduled switch-back time while the first PW is set to secondary, the second PW is set to the corresponding primary PW of the first PW, the first cost value is the second value, and the second cost value is the first value,
the first processor is further configured to set the first cost value to the first value,
the first PW is set to primary,
the second processor is further configured to set the second cost value to the second value,
the second PW is set to the corresponding secondary PW of the first PW, and,
the first value and the second value are both non-negative values,
the first value is smaller than the second value, and
a traffic in a downlink direction from the target network device to the user access device passes through the first route when the first cost value is lower than the second cost value, and passes through the second route when the second cost value is lower than the first cost value.

4. A system for reducing packet loss in a service protection scheme, comprising:
a first network device; and
a second network device; wherein:
the first network device comprises a first Layer 2 virtual Ethernet (L2VE) interface, a first Layer 3 virtual Ethernet (L3VE) interface, a first transceiver, and a first processor;
the second network device comprises a second L2VE interface, a second L3VE interface, a second transceiver, and a second processor; wherein:
the first transceiver is configured to communicate with a user access device by using a first pseudo wire (PW) through the first L2VE interface and communicate with a target network device by using a first route through the first L3VE interface, the first L2VE interface and the first L3VE interface belonging to a first virtual Ethernet interface group (VE Group),
the second transceiver is configured to communicate with the user access device by using a second PW through the second L2VE interface and communicate with the target network device by using a second route through the first L3VE interface, the second L2VE interface and the second L3VE interface belonging to a second VE Group,
in an initial state of normal operation of the first PW and the second PW:
the first processor is configured to set a cost value of the first route to a first value, the first value being preset,
the first PW is set to primary,
the second processor is configured to set a cost value of the second route to a second value, the second value being preset,
the second PW is set to a corresponding secondary PW of the first PW,
upon determining the first PW is in a failure state:
the first processor is further configured to set the cost value of the first route to the second value, the first PW is set to secondary, and
the second processor is further configured to set the cost value of the second route to the first value,
the second PW is set to a corresponding primary PW of the first PW
upon determining that the first PW recovers from the failure state:
waiting until a scheduled switch-back time while the first PW is set to secondary, the second PW is set to the corresponding primary PW of the first PW, the cost value of the first route is the second value, and the cost value of the second route is the first value,
the first processor is further configured to set the cost value of the first route to the first value,
the first PW is set to primary,
the second processor is further configured to set the cost value of the second route to the second value,
the second PW is set to the corresponding secondary PW of the first PW, and,
the first value and the second value are both non-negative values,
the first value is smaller than the second value, and
a traffic in a downlink direction from the target network device to the user access device passes through the first route when the cost value of the first route is lower than the cost value of the second route, and passes through the second route when the cost value of the second route is lower than the cost value of the first route.

5. The system of claim 4, wherein,
the first processor is configured to receive a command line, wherein the first value and the second value are pre-configured on the first network device by using the command line; and
the second processor is configured to receive the command line, wherein the first value and the second value are pre-configured on the second network device by using the command line.

6. The system of claim 4, wherein, the first value is a cost default value; and the first processor is configured to receive a command line, wherein the second value is pre-configured on the first network device by using the command line; and
the second processor is configured to receive the command line, wherein the second value is pre-configured on the second network device by using the command line.

* * * * *